(12) United States Patent
Tanaka (10) Patent No.: US 8,497,888 B2
(45) Date of Patent: Jul. 30, 2013

(54) IMAGE DISPLAY DEVICE

(75) Inventor: Mitsugi Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1028 days.

(21) Appl. No.: 12/461,297

(22) Filed: Aug. 6, 2009

(65) Prior Publication Data
US 2009/0315925 A1    Dec. 24, 2009

Related U.S. Application Data (63) Continuation-in-part of application No. PCT/JP2008/052021, filed on Feb. 7, 2008.

(30) Foreign Application Priority Data

Feb. 9, 2007 (JP) ................................. 2007-030120

(51) Int. Cl.
*G09G 5/02* (2006.01)
*G06F 3/038* (2006.01)
*G09G 5/00* (2006.01)
*G01J 1/58* (2006.01)

(52) U.S. Cl.
USPC ......... 345/697; 345/212; 345/698; 250/458.1

(58) Field of Classification Search
USPC ........................................................ 345/697
See application file for complete search history.

(56) References Cited

U.S. PATENT DOCUMENTS

| | | | |
|---|---|---|---|
| 5,479,224 A | 12/1995 | Yasugaki et al. | |
| 6,140,979 A * | 10/2000 | Gerhard et al. | 345/7 |
| 7,414,621 B2 * | 8/2008 | Yavid et al. | 345/204 |
| 2007/0035504 A1 | 2/2007 | Yamada | |
| 2007/0187616 A1 * | 8/2007 | Burroughs et al. | 250/458.1 |

FOREIGN PATENT DOCUMENTS

| | | |
|---|---|---|
| JP | A-1-245276 | 9/1989 |
| JP | A-5-276361 | 10/1993 |
| JP | A-6-194598 | 7/1994 |
| JP | A-2003-29197 | 1/2003 |
| JP | A-2003-255263 | 9/2003 |
| JP | A-2005-107126 | 4/2005 |
| JP | A-2005-308865 | 11/2005 |
| JP | A-2008-233561 | 10/2008 |
| WO | WO 2005/103794 A1 | 11/2005 |
| WO | WO 2008/114795 A1 | 9/2008 |

* cited by examiner

Primary Examiner — Charles V Hicks
(74) Attorney, Agent, or Firm — Oliff & Berridge, PLC (57) ABSTRACT

An image display device which can change an image size without the image deterioration and can suppress the large-sizing of the image display device is provided. The image display device includes an optical flux generator which is configured to generate and radiate an optical flux in response to an image signal read out for every dot clock, and an optical scanning part which is configured to display an image by scanning the optical flux two-dimensionally. By changing timing at which the optical flux is radiated from the optical flux generator, a size of an image to be displayed is changed. The change of the timing at which the optical flux is radiated from the optical flux generator is performed by changing a period of the dot clock.

8 Claims, 10 Drawing Sheets

CLOCK TABLE

| DOT CLOCK NUMBER | NUMBER OF MASTER CLOCKS | DOT CLOCK NUMBER | NUMBER OF MASTER CLOCKS |
|---|---|---|---|
| 1 | 6 | 31 | 3 |
| 2 | 5 | 32 | 4 |
| 3 | 6 | 33 | 3 |
| 4 | 5 | 34 | 4 |
| 5 | 4 | 35 | 3 |
| 6 | 5 | 36 | 4 |
| 7 | 4 | 37 | 3 |
| 8 | 5 | 38 | 4 |
| 9 | 4 | 39 | 3 |
| 10 | 4 | 40 | 4 |
| 11 | 4 | 41 | 3 |
| 12 | 4 | 42 | 4 |
| 13 | 4 | 43 | 3 |
| 14 | 4 | 44 | 4 |
| 15 | 4 | 45 | 4 |
| 16 | 3 | 46 | 3 |
| 17 | 4 | 47 | 4 |
| 18 | 4 | 48 | 4 |
| 19 | 3 | 49 | 4 |
| 20 | 4 | 50 | 4 |
| 21 | 3 | 51 | 4 |
| 22 | 4 | 52 | 4 |
| 23 | 3 | 53 | 5 |
| 24 | 4 | 54 | 4 |
| 25 | 3 | 55 | 5 |
| 26 | 4 | 56 | 5 |
| 27 | 3 | 57 | 5 |
| 28 | 3 | 58 | 5 |
| 29 | 4 | 59 | 5 |
| 30 | 3 | 60 | 6 |

LOOKUP TABLE
(BRIGHTNESS TABLE)

| DOT CLOCK NUMBER | BRIGHTNESS CORRECTION RATE | DOT CLOCK NUMBER | BRIGHTNESS CORRECTION RATE |
|---|---|---|---|
| 1 | 1.000 | 31 | 1.701 |
| 2 | 1.001 | 32 | 1.603 |
| 3 | 1.002 | 33 | 1.523 |
| 4 | 1.005 | 34 | 1.456 |
| 5 | 1.008 | 35 | 1.399 |
| 6 | 1.012 | 36 | 1.35 |
| 7 | 1.016 | 37 | 1.308 |
| 8 | 1.022 | 38 | 1.271 |
| 9 | 1.028 | 39 | 1.238 |
| 10 | 1.036 | 40 | 1.209 |
| 11 | 1.044 | 41 | 1.183 |
| 12 | 1.054 | 42 | 1.16 |
| 13 | 1.065 | 43 | 1.14 |
| 14 | 1.076 | 44 | 1.121 |
| 15 | 1.090 | 45 | 1.105 |
| 16 | 1.105 | 46 | 1.09 |
| 17 | 1.121 | 47 | 1.076 |
| 18 | 1.140 | 48 | 1.065 |
| 19 | 1.160 | 49 | 1.054 |
| 20 | 1.183 | 50 | 1.044 |
| 21 | 1.209 | 51 | 1.036 |
| 22 | 1.238 | 52 | 1.028 |
| 23 | 1.271 | 53 | 1.022 |
| 24 | 1.308 | 54 | 1.016 |
| 25 | 1.350 | 55 | 1.012 |
| 26 | 1.399 | 56 | 1.008 |
| 27 | 1.456 | 57 | 1.005 |
| 28 | 1.523 | 58 | 1.002 |
| 29 | 1.603 | 59 | 1.001 |
| 30 | 1.701 | 60 | 1 |

Fig. 10C

IMAGE DISPLAY DEVICE

CROSS-REFERENCE TO RELATED APPLICATIONS

This application is a Continuation-in-Part of International Application PCT/JP2008/052021 filed on Feb. 7, 2008, which claims the benefits of Japanese Patent Application No. 2007-030120 filed Feb. 9, 2007.

BACKGROUND

1. Field

The present invention relates to an image display device, and more particularly to an image display device which can change a size of an image to be displayed.

2. Description of the Related Art

Conventionally, there has been known an image display device which displays an image by forming an optical flux corresponding to an image signal and by scanning such an optical flux.

With respect to such an image display device, there has been known an image display device which is configured to change (enlarge or shrink) a size of an image to be displayed. For example, JP-A-6-194598 discloses a head-mounting-type display device which projects an image displayed on an image display element on an eye ball of a user, wherein the display device allows the user to observe an image at a desired angle of field and with the desired magnification by enabling the changeover of the projection magnification.

SUMMARY

However, the conventional image display device changes a size of an image to be displayed by moving an optical system and hence, the constitution of the image display device becomes complicated thus giving rise to drawbacks such as large-sizing of the image display device or the increase of power loss.

It may be possible to adopt a method which changes a size of an image to be displayed on an image display element by processing the image to be displayed. Although this method may obviate large-sizing of the image display device, there arises a drawback on the deterioration of an image such as coarse or poor resolution of an image to be displayed.

Accordingly, it is desirable to provide an image display device which can change a size of an image while suppressing the deterioration of image or the power loss with the simple constitution.

According to one aspect of the present invention, there is provided an image display device which includes: an optical flux generator which is configured to generate and radiate an optical flux in response to an image signal read out for every dot clock; and an optical scanning part which is configured to display an image by scanning the optical flux two-dimensionally. By changing timing at which the optical flux is radiated from the optical flux generator, a size of an image to be displayed is changed.

DETAILED DESCRIPTION

Hereinafter, preferred embodiments of the present invention are explained by reference to drawings. In the embodiments explained hereinafter, the present invention is applied to a retinal scanning display as one example of an image display device. As other image display devices, an optical-scanning-type projection image display device (for example, a laser) and the like are named.

(First Embodiment)
[1. Explanation of Schematic Constitution of Image Display Device]

Figure 1:
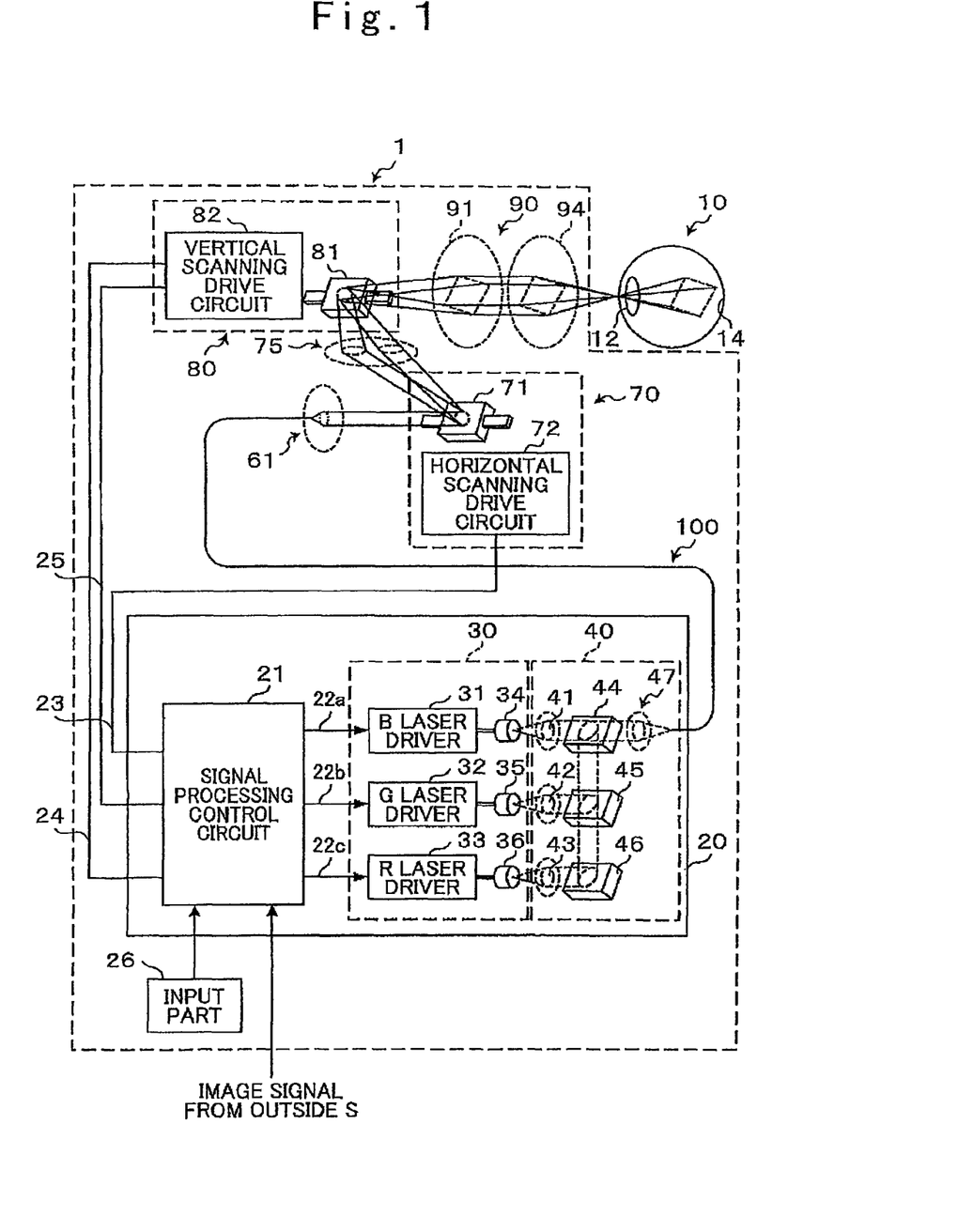
FIG. 1 is a view showing the whole constitution of an image display device of a first embodiment.

First of all, the constitution and the manner of operation of the image display device 1 are explained schematically. FIG. 1 shows the whole constitution of the image display device 1 of the first embodiment according to the present invention. The image display device 1 is a retinal scanning display. An optical flux is incident on a pupil 12 of a user who is a viewer of the image display device 1 and an image is projected on his/her retina 14 thus allowing the user to visually recognize a virtual image in front of the pupil 12 of a user's eye 10.

The image display device 1 includes an optical flux generator 20 which reads an image signal S supplied from the outside for every dot clock, generates an optical flux whose intensity is modulated based on the read image signal and radiates the optical flux. The image display device 1 also includes, between the optical flux generator 20 and the user's eye 10, a scanning part which displays an image by scanning the optical flux. The scanning part includes a collimation optical system 61 which collimates laser beams (hereinafter, referred to as "optical flux") generated by the optical flux generator 20 and radiated via an optical fiber 100, a horizontal scanning part 70 (constituting one example of a high-speed scanning part) which scans the optical flux collimated by the collimation optical system 61 in a horizontal direction (first scanning direction) for an image display, a vertical scanning part 80 (constituting one example of a low-speed scanning part) which scans the optical flux scanned in the horizontal direction using the horizontal scanning part 70 in the vertical direction (second scanning direction) at a relatively low speed, a first relay optical system 75 which is formed between the horizontal scanning part 70 and the vertical scanning part 80, a second relay optical system 90 which radiates the optical fluxes scanned in the horizontal direction as well as in the vertical direction in this manner (hereinafter, referred to as "scanned optical flux") to the pupil 12, and an input part 26 which performs an operation for changing (enlarging and shrinking) a size of an image recognized by the user (hereinafter referred to as "display image size").

As shown in FIG. 1, the optical flux generator 20 includes a signal processing circuit 21 which generates respective signals or the like which become components for synthesizing an image based on the image signal S supplied from the outside. The signal processing circuit 21 generates respective image signals 22a to 22c of blue (B), green (G) and red (R) and outputs these image signals 22a to 22c. Further, the signal processing circuit 21 outputs a horizontal synchronizing signal 23 used in the horizontal scanning part 70 and a vertical synchronizing signal 24 used in the vertical scanning part 80 respectively.

Further, the optical flux generator 20 includes a light source part 30 for forming three image signals (B, R, G) 22a to 22c outputted from the signal processing circuit 21 for every dot clock into optical fluxes respectively, and an optical synthesizing part 40 for generating an arbitrary optical flux by combining these three optical fluxes into one optical flux.

The light source part 30 includes a B laser 34 for generating a blue optical flux and a B laser driver 31 for driving the B laser 34, a G laser 35 for generating a green optical flux and a G laser driver 32 for driving the G laser 35 and an R laser 36 for generating a red optical flux and an R laser driver 33 for driving the R laser 36. Here, the respective lasers 34, 35, 36 may be constituted of a semiconductor laser or a solid-state laser with a harmonics generation mechanism, for example. Further, when the respective lasers are formed of the semiconductor laser, a drive current may be directly modulated so as to perform the modulation of intensity of optical flux, while when the respective lasers are formed of the solid laser, it is necessary to perform the modulation of the intensity of the optical flux by providing an external modulator to every laser.

The optical synthesizing part 40 includes collimation optical systems 41, 42, 43 provided for collimating the optical fluxes incident from the light source part 30, dichroic mirrors 44, 45, 46 provided for synthesizing the collimated optical fluxes, and a coupling optical system 47 for guiding a synthesized optical flux to the optical fiber 100. The optical fluxes radiated from the respective lasers 34, 35, 36 are, after respectively being collimated by the collimation optical systems 41, 42, 43, incident on the dichroic mirrors 44, 45, 46. Thereafter, using these dichroic mirrors 44, 45, 46, the respective optical fluxes are reflected on the dichroic mirrors 44, 45, 46 or are allowed to pass through the dichroic mirrors 44, 45, 46 selectively with respect to wavelengths thereof, arrive at the coupling optical system 47, and are converged by the coupling optical system 47. Then, the converged optical fluxes are outputted to the optical fiber 100.

The horizontal scanning part 70 and the vertical scanning part 80, to bring the optical fluxes incident from the optical fiber 100 into a state which allows the optical fluxes to be projected as an image, scan the optical fluxes in the horizontal direction as well as in the vertical direction to form the optical fluxes into scanned optical fluxes.

The horizontal scanning part 70 has a scanning element 71 which constitutes a resonance-type scanning element having a reflection surface which is a deflection surface for scanning the optical fluxes in the horizontal direction, and a horizontal scanning drive circuit 72 which includes a drive signal generator for generating a drive signal for allowing the scanning element 71 to resonate so as to swing a reflection surface thereof. A Galvano mirror or the like may be used as the resonance-type scanning element 71. Here, the resonance-type scanning element 71 may adopt any drive method such as piezoelectric driving, electromagnetic driving or electrostatic driving provided that the reflection surface of the scanning element 71 can be swung or rotated so as to scan the optical fluxes.

The vertical scanning part 80 includes a scanning element 81 having a reflection surface which is a deflection surface for scanning the optical fluxes in the vertical direction, and a vertical scanning drive circuit 82 which drives the scanning element 81 non-resonantly. A Galvano mirror or the like may be used as the scanning element 81. Here, the scanning element 81 may adopt any drive method such as piezoelectric driving, electromagnetic driving or electrostatic driving provided that the reflection surface of the scanning element 81 can be swung or rotated so as to scan the optical fluxes.

Here, the horizontal scanning drive circuit 72 and the vertical scanning drive circuit 82 respectively drive the scanning element 71 and the scanning element 81 in response to a horizontal synchronizing signal 23 and a vertical synchronizing signal 24 which are outputted from the signal processing circuit 21. Further, the vertical scanning drive circuit 82 swings the reflection surface of the scanning element 81 by determining a swing range of the reflection surface of the scanning element 81 in response to a swing range designation signal 25 outputted from the signal processing circuit 21.

Further, as described above, the image display device 1 includes a first relay optical system 75 which relays the optical fluxes between the horizontal scanning part 70 and the vertical scanning part 80. Optical fluxes which are scanned in the horizontal direction by the scanning element 71 pass through the first relay optical system 75 and are scanned by the scanning element 81 in the vertical direction, and are radiated to the second relay optical system 90 as the two-dimensionally-scan optical fluxes.

The second relay optical system 90 includes lens systems 91, 94 having a positive refracting power. The scan optical fluxes radiated from the vertical scanning part 80, using the lens system 91, have center lines thereof respectively arranged parallel to each other and are respectively converted into converged optical fluxes. Then, using the lens system 94, the converged optical fluxes are arranged substantially parallel to each other and, at the same time, are converted such that the center lines of these optical fluxes are converged on the pupil 12 of the user.

Here, in this embodiment, the optical flux incident from the optical fiber 100 is scanned in the horizontal direction by the horizontal scanning part 70 and, thereafter, is scanned in the vertical direction by the vertical scanning part 80. However, the arrangement of the horizontal scanning part 70 and the arrangement of the vertical scanning part 80 may be exchanged so that the optical flux may be scanned in the vertical direction by the vertical scanning part 80 and, thereafter, may be scanned in the horizontal direction by the horizontal scanning part 70.

Further, in this embodiment, the horizontal scanning part 70 is formed of the resonance-type scanning system and the vertical scanning part 80 is formed of the non-resonance-type scanning system. However, the present invention is not limited to such a case, and the horizontal scanning part 70 may be formed of a non-resonance-type scanning system, for example. Further, although explained in detail later, the vertical scanning part 80 is a scanning system which scans the optical flux by oscillating the reflection surface of the scanning element 81 in a sawtooth-waveform shape.

Figure 2A:
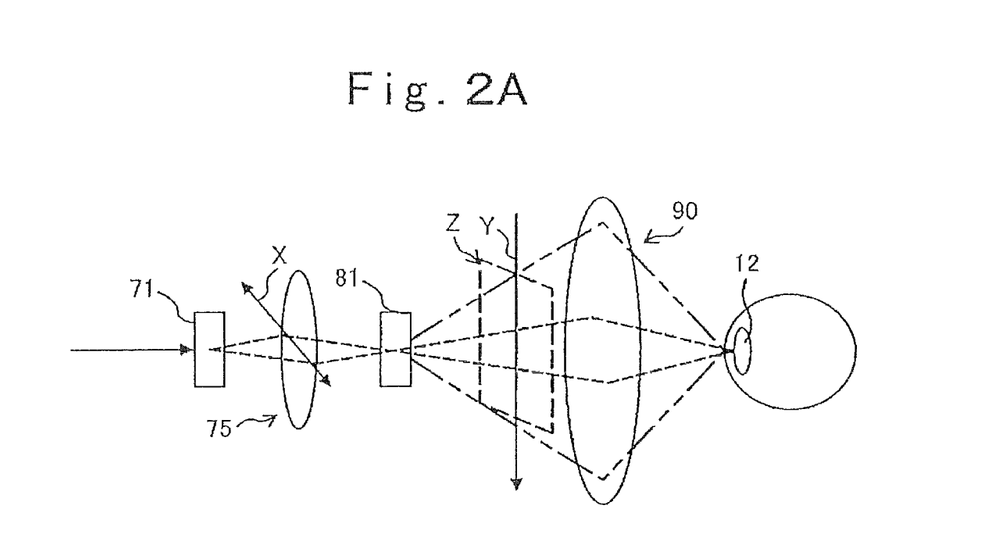
FIG. 2 is a view for explaining scanning of an optical flux by a scanning part.

As shown in FIG. 2A, the scanning element 71 which performs the relatively high-speed oscillation is subject to resonance oscillation by the horizontal scanning drive circuit 72 so as to perform the reciprocating scanning of an incident optical flux with respect to the horizontal direction X. Then, the scanned beams which are scanned in the horizontal direction by the scanning element 71 are incident on the vertical scanning part 80 via the first relay optical system 75. The scanning element 81 of the vertical scanning part 80 is oscillated in a sawtooth-waveform shape by the vertical scanning drive circuit 82 such that the incident optical fluxes are scanned with respect to the vertical direction Y. Then, the scanned optical fluxes which are scanned in the vertical direction by the scanning element 81 and fall within a scanning range Z are incident on the pupil 12 of the user via the second relay optical system 90.

Figure 2B:
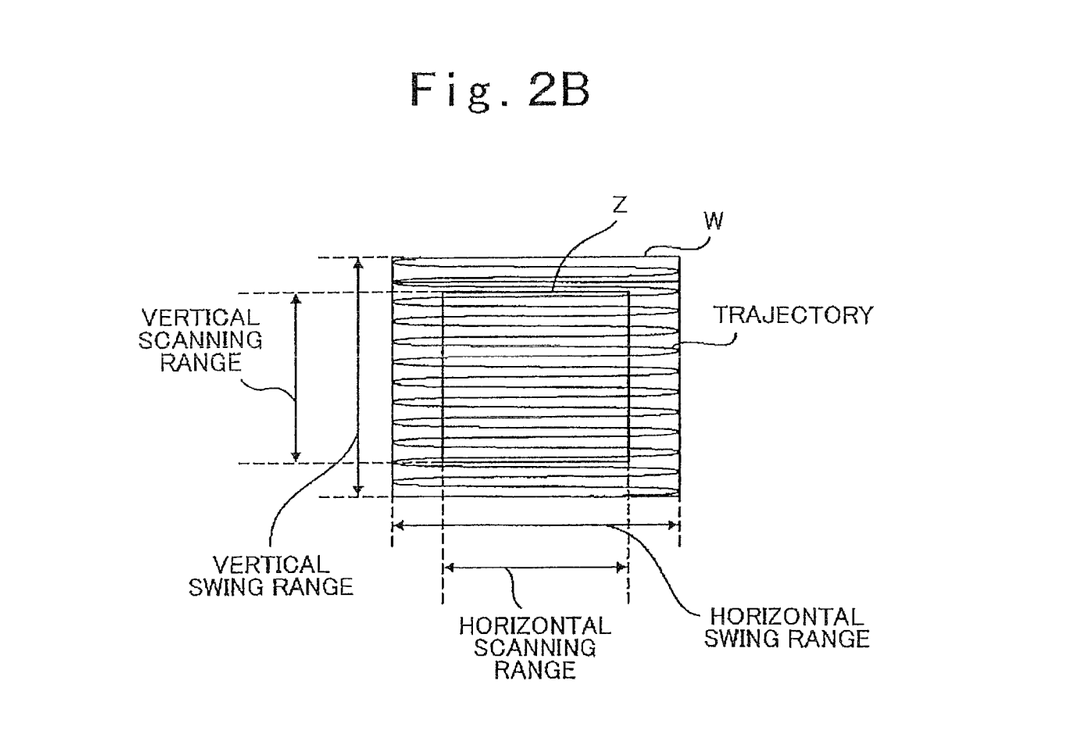

FIG. 2B is a view for explaining the relationship between a swing range W (a horizontal swing range and a vertical swing range) of the scanning element 71 and the scanning element 81 and a scanning range Z (a horizontal scanning range and a vertical scanning range). Here, the "horizontal swing range" is a range in which optical fluxes can be scanned using the reflection surface of the scanning element 71, the "vertical swing range" is a range in which optical flux can be scanned using the reflection surface of the scanning element 81, and the "swing range W" is a range in which the optical fluxes can be scanned by the scanning element 71 and the scanning element 81. Further, the "horizontal scanning range" is a range of optical fluxes scanned by the reflection surface of the scanning element 71, the "vertical scanning range" is a range of optical fluxes scanned by the reflection surface of the scanning element 81, and the "scanning range Z" is a range of optical fluxes scanned by the scanning element 71 and the scanning element 81. Further, FIG. 2B shows an imaginary trajectory of the optical fluxes scanned by the horizontal scanning part 70 and the vertical scanning part 80 assuming that the optical fluxes are constantly radiated from the optical flux generator 20.

As shown in FIG. 2B, within the swing range W of the scanning element 71 and the scanning element 81, by allowing the optical flux generator 20 to radiate the optical fluxes at timing of the scanning range Z (horizontal scanning range as well as vertical scanning range), the optical fluxes are scanned in the scanning range Z by the horizontal scanning part 70 and the vertical scanning part 80.

The optical flux generator 20 includes a detection light source which radiates a detection light toward a scanning surface of the scanning element 71 of the horizontal scanning part 70 for detecting a swing position of the scanning surface of the scanning element 71, and a light detector which detects the detection light reflected on the scanning surface of the scanning element 71. Due to such constitution, the optical flux generator 20 detects the swing position of the scanning surface of the scanning element 71 in response to a signal outputted from the light detector (hereinafter referred to as "displacement signal"). Then, the optical flux generator 20, based on the displacement signal, generates signals such as the horizontal synchronizing signal 23 and the vertical synchronizing signal 24, determines the radiation start timing of the optical fluxes, and radiates the optical fluxes.

Further, for detecting a swing position of the scanning surface of the scanning element 71, as described in JP-A-2006-276634, a displacement signal outputted from the scanning element 71 may be used. That is, a scanning element which can output a displacement signal corresponding to the displacement of the reflection surface is used as the scanning element 71, and a swing position of the reflection surface in the scanning element 71 is detected by the optical flux generator 20 in response to the displacement signal outputted from the scanning element 71. Due to such constitution, the above-mentioned detection light source and the light detector become unnecessary.

[2. Constitution and Manner of Operation of Signal Processing Circuit]

(2.1 Constitution of Signal Processing Circuit)

Figure 3:
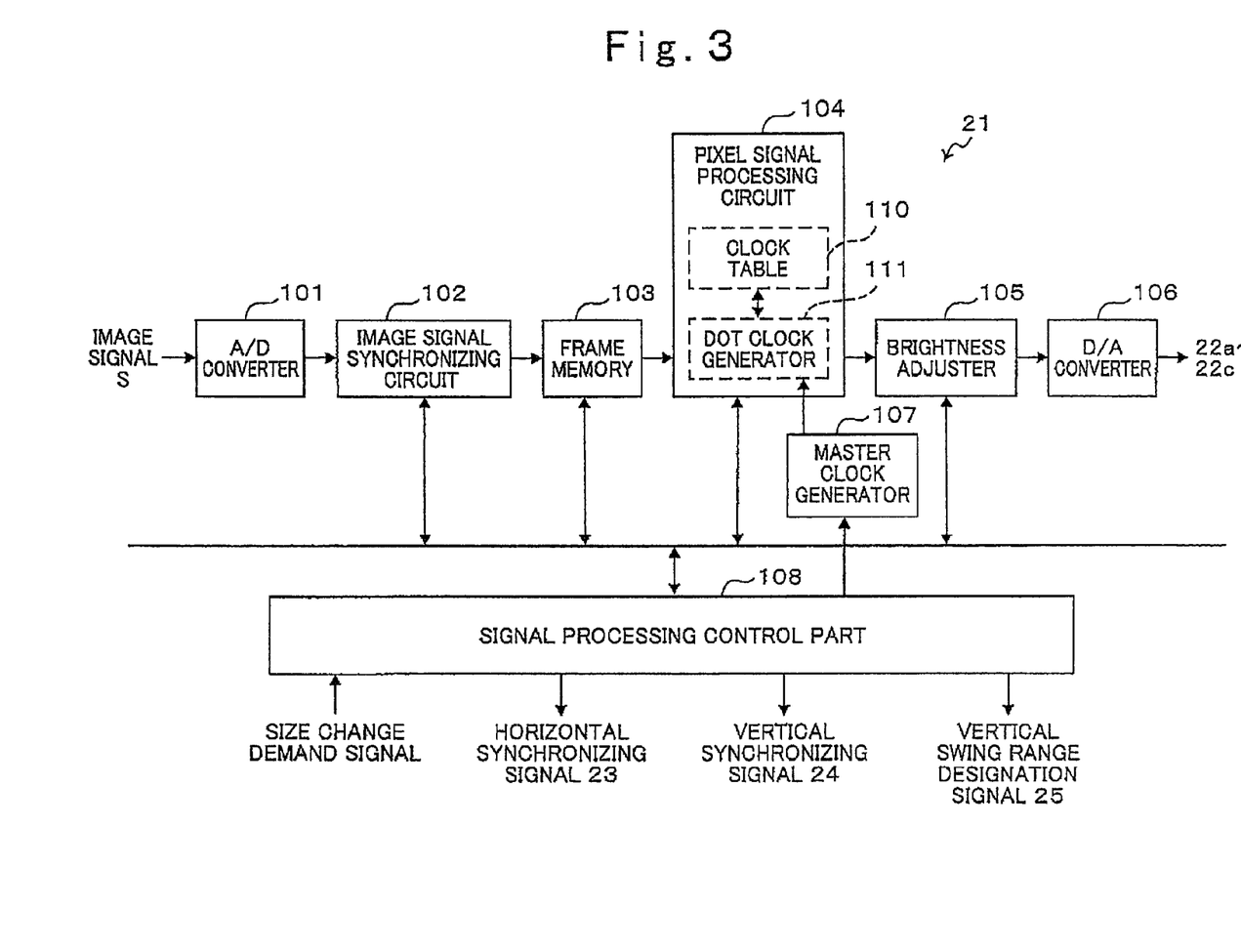
FIG. 3 is a view showing the constitution of a portion of a signal processing circuit shown in FIG. 1.

Next, the constitution of the signal processing circuit 21 is specifically explained by reference to drawings. FIG. 3 is a schematic view showing the constitution of a portion of the signal processing circuit 21 which outputs image signals (B, R, G) 22a to 22c based on the image signal S.

As shown in FIG. 3, the signal processing circuit 21 includes an A/D converter 101 which digitalizes the image signal S, an image signal synchronizing circuit 102 which synchronizes with the digitalized image signal S, a frame memory 103 which stores the image signal outputted from the image signal synchronizing circuit 102 per frame, a pixel signal processing circuit 104 which generates dot clocks having a clock period corresponding to pixel positions of an image to be displayed, reads the image signal stored in the frame memory 103 for every dot clock per pixel and generates image signals for respective colors (B, R, G) (hereinafter referred to as "pixel signal"), a brightness adjuster 105 which adjusts brightnesses of pixel signals for respective colors outputted from the pixel signal processing circuit 104 based on a lookup table (brightness table) stored in the brightness adjuster 105, a D/A converter 106 which converts the pixel signals for respective colors whose brightnesses are adjusted by the brightness adjuster 105 into analogue signals and outputs the analogue signals as image signals (B, R, G) 22a to 22c, a master clock generator 107 which generates master clocks constituting basic clocks of the signal processing circuit 21, and a signal processing control part 108 which controls the whole signal processing circuit 21.

The pixel signal processing circuit 104 includes a clock table 110 which sequentially stores the number of master clocks corresponding to the clock periods of the dot clocks (hereinafter referred to as "period of dot clocks) sequentially for every dot clock from the dot clock at a scanning start position of the optical flux, and a dot clock generator 111 which, based on the clock table 110, generates dot clocks having clock periods corresponding to the scanning directions of the optical flux using the scanning element 71 by dividing the frequency of the master clocks.

(2.2 Clock Table)

Figure 4:
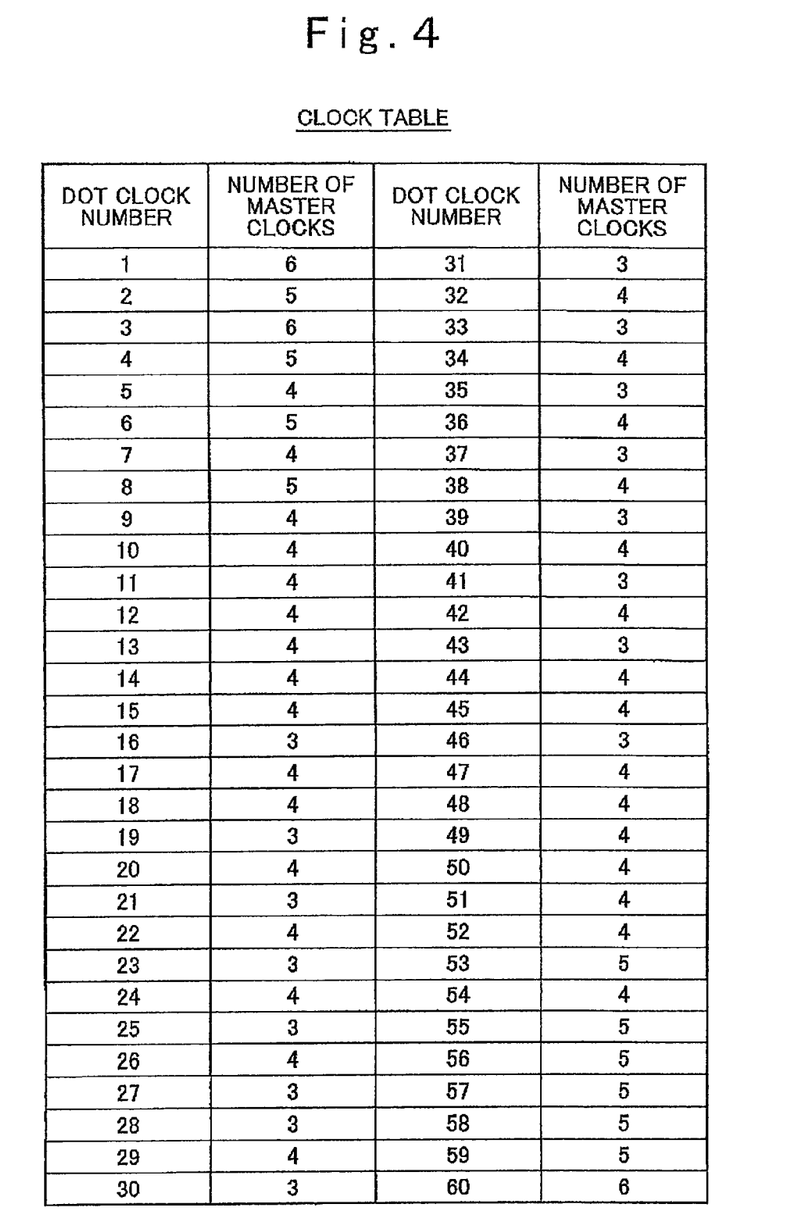
FIG. 4 is a view showing an example of a clock table.
Figure 5:
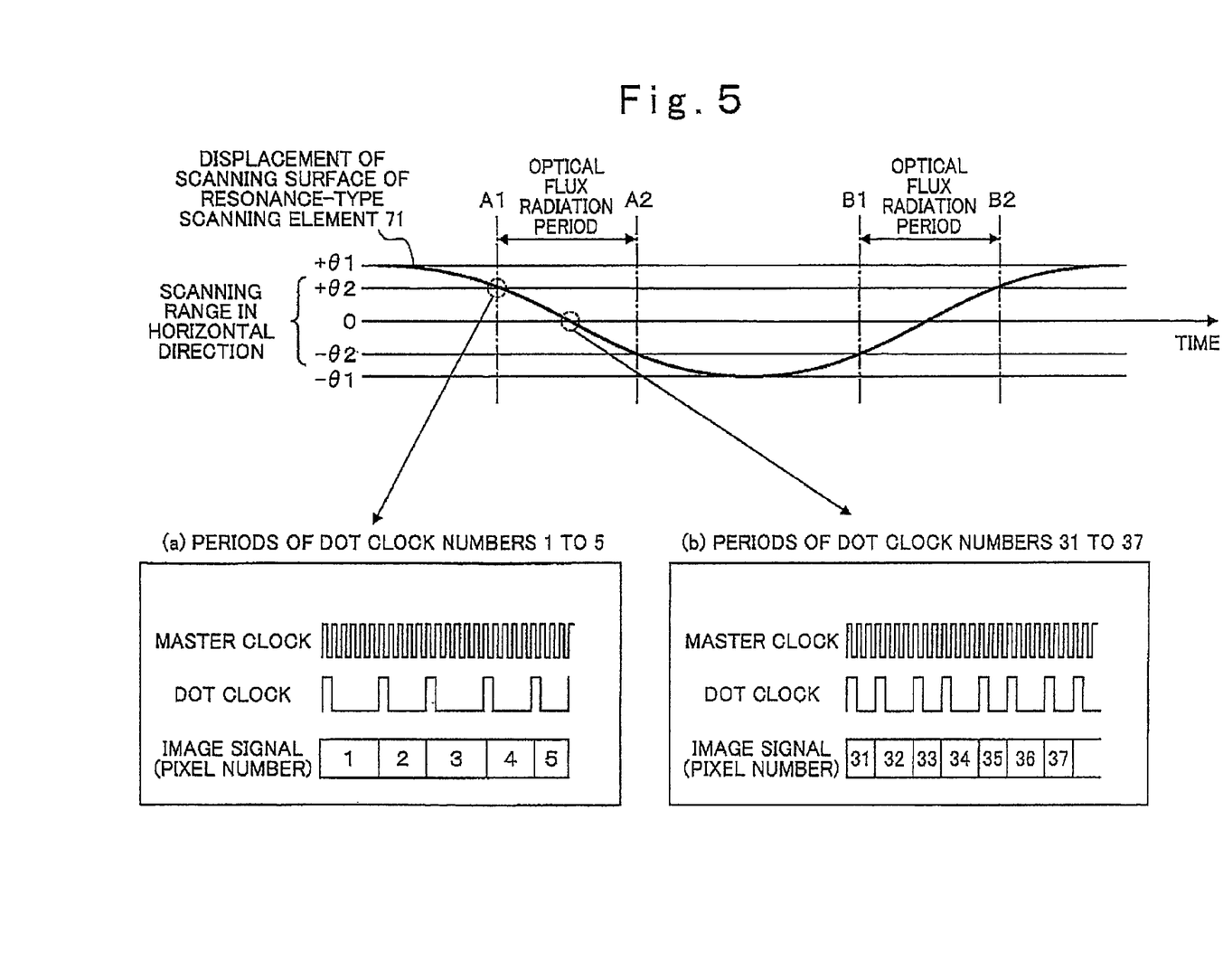
FIG. 5 is a view showing a relationship among a dot clock generated based on a clock table, a master clock and image signals for respective pixels.

Here, the clock table 110 is explained specifically. FIG. 4 is a view showing an example of a clock table 110 of this embodiment, and FIG. 5 is a view showing the relationship among the dot clocks generated based on the clock table 110 shown in FIG. 4, the master clocks, and the pixel signal for every pixel. To facilitate the understanding of the invention, the number of pixels in the horizontal direction is set to 60 dots.

As shown in FIG. 4, the clock table 110 is a clock table which sequentially stores the number of master clocks corresponding to the clock period for every dot clock from the dot clock at the scanning start position of the optical flux.

The dot clock generator 111 generates the dot clock for reading an image signal for every pixel by dividing frequency of the master clocks by reference to the clock table 110. The clock table 110 is a clock table of an example in which 60 pixels are arranged in the horizontal direction as described previously, wherein the numbers of 1 to 60 are sequentially allocated to the pixels ranging from the pixel at the optical flux scanning start position to the pixel at the optical flux scanning finishing position in order of the dot clocks.

In the clock table 110 shown in FIG. 4, the number of master clocks is set to "6", "5", ..., "5", "6" in order from the dot clock number 1 to the dot clock number 60. The dot clock generator 111 generates the dot clocks having the clock period in which the number of master clocks is set to "6", "5", ..., "5", "6" in order from the optical flux scanning start position. That is, the dot clock generator 111 generates the dot clocks having the clock period corresponding to the scanning direction of the optical flux based on the clock table 110. The reason that the period of the dot clocks is changed corresponding to the scanning direction of the optical flux is that an oscillation speed of the scanning element 71 differs depending on a position of the reflection surface.

FIG. 5 shows the relationship among the dot clocks, the master clocks and the image signals for respective pixels from the dot clock number 1 to the dot clock number 5, and the relationship among the dot clocks, the master clocks and the image signals for respective pixels from the dot clock number 31 to the dot clock number 37.

As shown in FIG. 5, in the clock period of the dot clock number 1, the number of master clocks is 6. During this clock period, the image signal at the first pixel position (pixel number 1) is read by the pixel signal processing circuit 104 and is outputted to the light source part 30. Further, in the clock period of the dot clock number 31, the number of master clocks is 3. During this clock period, the image signal at the 31st pixel position (pixel number 31) in the horizontal direction is read by the pixel signal processing circuit 104 and is outputted to the light source part 30.

In this manner, the dot clock generator 111 is configured to generate the dot clocks having clock periods corresponding to the scanning directions of the optical flux by dividing the frequency of the master clocks based on the clock table 110 and hence, the optical flux can be scanned such that the scanning directions of the pixels are arranged at equal intervals.

(2.3 Lookup Table)

To the image signal which is read for every pixel based on the dot clock generated by the dot clock generator 111 described above, the adjustment of a brightness value is applied by the brightness adjuster 105 by reference to the lookup table.

Figure 6:
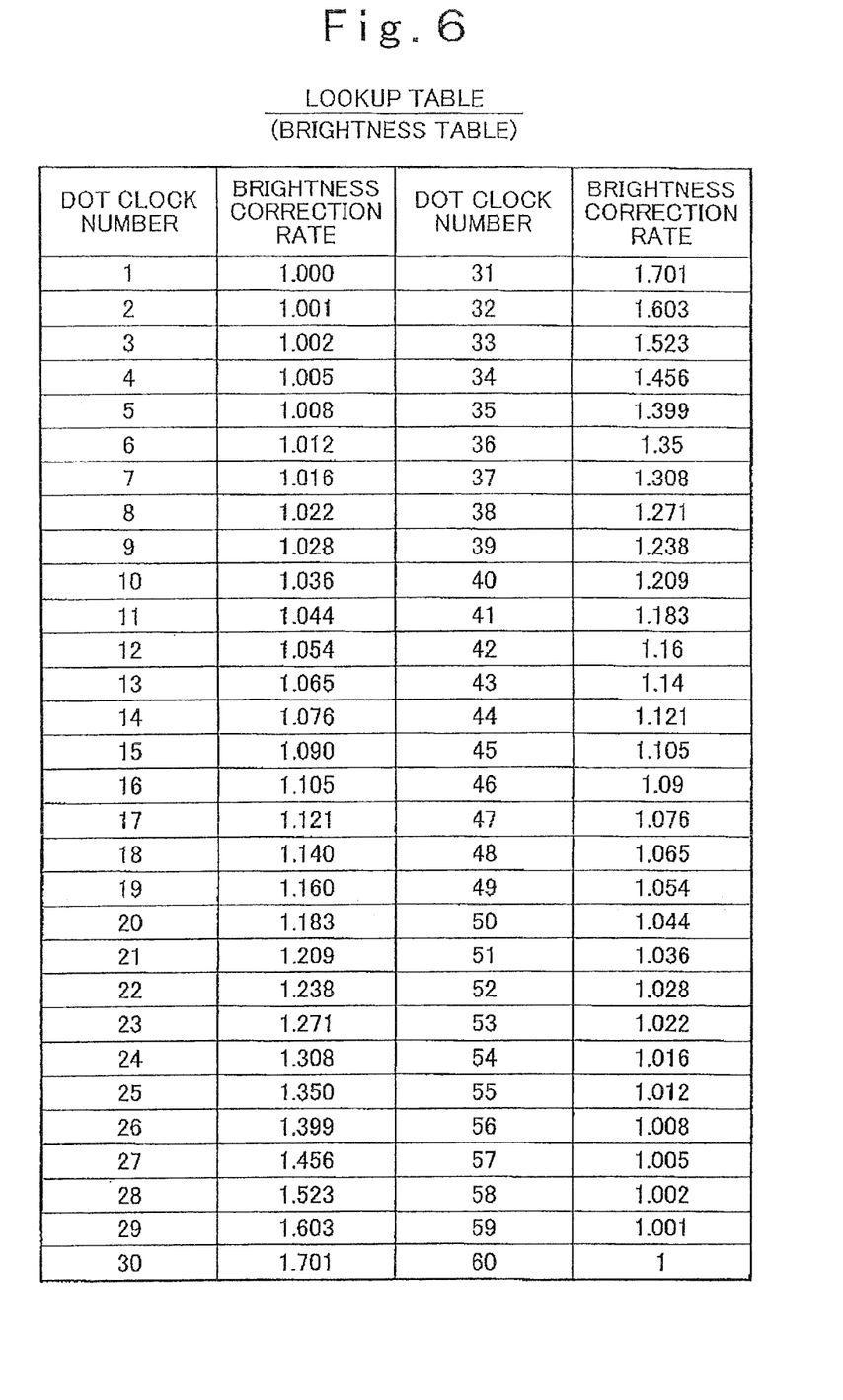
FIG. 6 is a view showing an example of a lookup table.

In the lookup table, as shown in FIG. 6, brightness correction rate which is a brightness value corresponding to a clock period of the dot clock generated by the dot clock generator 111 is set corresponding to the dot clock number. That is, the brightness correction rate which is the brightness information corresponding to the clock period of the dot clock is stored sequentially for every dot clock from the dot clock at the optical flux scanning start position. The brightness correction rate is a value substantially equal to the inverse number of a speed of the scanning element 71 at a scanning position for every pixel.

Since the brightness of the image signal is adjusted by correcting the brightness of the image signal with the brightness correction rate of a value substantially equal to the inverse number of the speed of the scanning element 71, any dot (pixel) of the image displayed by the image display device 1 acquires the brightness distribution substantially equal to the brightness distribution of the original image based on the image signal S. Accordingly, it is possible to suppress the generation of the brightness irregularities thus enhancing the quality of the image displayed by the image display device 1.

Further, the brightness adjuster 105 is also configured to change all brightness correction rates in the lookup table with desired magnification (hereinafter referred to as "brightness magnification"). Accordingly, the brightness of the whole display image is increased by increasing the brightness magnification, and the brightness of the whole display image is decreased by decreasing the brightness magnification.

(2.4 Constitution for Changing Display Image Size)

Figure 7:
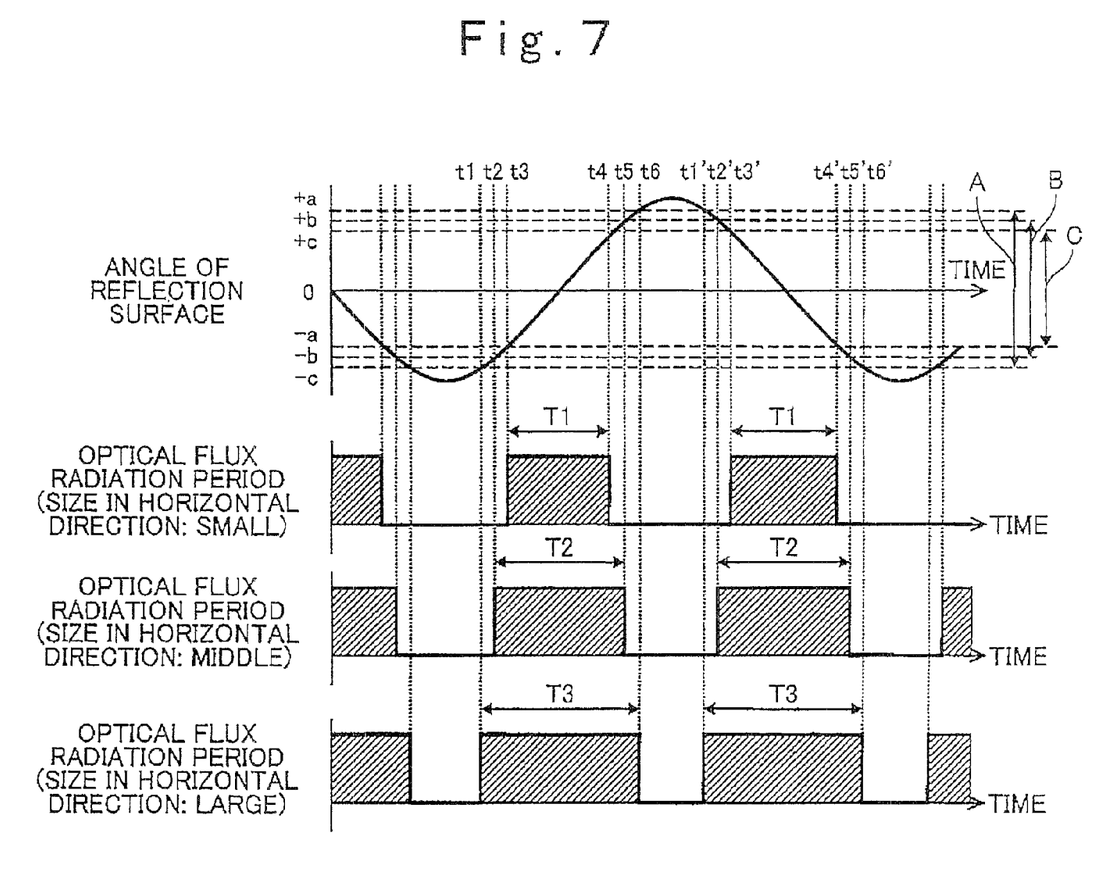
FIG. 7 is a view for explaining a change of a display image size in a horizontal direction.

Next, the constitution and the manner of operation for changing (expanding and shrinking) a size of an image which a user observes with naked eyes is specifically explained by reference to drawings. FIG. 7 is a view for explaining the change of the display image size in the horizontal direction, and FIG. 8 is a view for explaining the change of the display image size in the vertical direction.

(2.4.1 Constitution for Changing Display Image Size in the Horizontal Direction)

With respect to the change of the display image size, firstly, the change of the display image size in the horizontal direction is explained. As shown in FIG. 5, the reflection surface of the scanning element 71 is subject to the resonance oscillation (swing) by the horizontal scanning drive circuit 72 within an angular range of +θ1 to −θ1 with respect to a predetermined position which constitutes the reference (0 degree). Further, the optical flux from the light source part 30 is radiated when a displacement position of the reflection surface of the scanning element 71 falls within an angular range (scanning range) of +θ2 to −θ2 with respect to the above-mentioned predetermined position. The reflection surface of the scanning element 71 is configured to radiate the optical flux from the light source part 30 within an angle from +θ2 to −θ2 (timing from A1 to A2) and within an angle from −θ2 to +θ2 (timing from B1 to B2).

In this embodiment, the display image size in the horizontal direction is changed by changing a value of this "θ2". That is, in this embodiment, the display image size is changed by changing the timing at which the optical flux is radiated from the optical flux generator 20 without changing the swing range (+θ1 to −θ1) of the reflection surface of the scanning element 71.

The change of the timing at which the optical flux is radiated from the optical flux generator 20 is performed when a user of the image display device 1 demands a change of a display image size by operating the input part 26. When such a demand operation is performed by the user, a size change demand signal is inputted to the signal processing circuit 21. In response to this size change demand signal, the signal processing circuit 21 changes the display image size. The change of the display image size is performed by executing three processing consisting of (a) a change of a period of the dot clock, (b) a change of radiation start timing of the optical flux, and (c) the correction of brightness. Here, "radiation start timing of the optical flux" implies start timing of radiation of the optical flux in the horizontal direction for every scanning line (for example, timing A1 or B1 in FIG. 5). Further, timing at which the radiation of the optical flux is finished (for example, timing A2 or B2 in FIG. 5) is determined based on the radiation start timing of the optical flux and a period of the dot clock.

(Change of Period of Dot Clock)

First of all, the change of the period of a dot clock is performed by changing a clock period of a master clock outputted from the master clock generator 107 (hereinafter, referred to as "period of a master clock"). That is, the signal processing control part 108 outputs a control signal to the master clock generator 107 such that a period of a master clock corresponding to a display image size designated by an operation of the input part 26 by a user is obtained. The master clock generator 107 generates a master clock of a clock period corresponding to the control signal from the signal processing control part 108. Then, the dot clock generator 111 generates a dot clock based on the master clock whose clock period is changed using the clock table 110.

Accordingly, when the user operates the input part 26 for enlarging an image size, a period of the master clock outputted from the master clock generator 107 is prolonged, and a period in which the optical flux is radiated from the optical flux generator 20 in the horizontal direction for every scanning line is prolonged (for example, from a period indicated by "T2" to a period indicated by "T3" in FIG. 7). Further, when the user operates the input part 26 for shrinking an image size, a period of the master clock outputted from the master clock generator 107 is shortened, and a period in which the optical flux is radiated from the optical flux generator 20 in the horizontal direction for every scanning line is shortened (for example, from the period indicated by "T2" to the period indicated by "T1" in FIG. 7).

In this manner, the period of the dot clock is changed by changing the period of the master clock and hence, the period of the dot clock can be changed easily.

Further, the change of the period of the dot clock may be performed by changing a frequency dividing ratio from the master clock to the dot clock in place of changing the period of the master clock. That is, the dot clock generator 111, in dividing frequency of the master clock, changes the frequency dividing ratio so as to change the clock period of the dot clock. Although the change of the frequency dividing ratio may be performed by changing the number of master clocks in the clock table 110 (for example, by providing a plurality of clock tables 110, and by selecting a clock table corresponding to a display image size to be changed), the frequency dividing ratio may be also changed by providing an arithmetic processing unit. That is, an arithmetic operation which changes the number of master clocks defined in the clock table 110 corresponding to the image size by the arithmetic processing unit, and the dot clock is generated based on the number of master clocks calculated in this manner. Due to such an operation, even when the display image size is changed in various sizes, it is possible to change the display image size without increasing the number of clock tables 110.

(Change of Radiation Start Timing of Optical Flux)

Further, the radiation start timing of the optical flux is changed by changing the generation timing of the dot clock which is given the dot clock number 1 (see FIG. 3). That is, the signal processing control part 108 outputs a control signal to the pixel signal processing circuit 104 such that the output start timing of the optical flux corresponding to the display image size designated by an operation of the input part 26 by a user is obtained. The dot clock generator 111 in the pixel signal processing circuit 104 determines the generation timing of the dot clock which is given the dot clock number 1 in response to a control signal from the signal processing control part 108. Then, the dot clock generator 111 starts the sequential generation of dot clocks based on the clock table 110 from the dot clock which is given the dot clock number 1 at the above-determined generation start timing. The pixel signal processing circuit 104 starts outputting of the image signal in the horizontal direction from the dot clock which is given the dot clock number 1.

For example, when the user operates the input part 26 for enlarging the display image size, the signal processing control part 108 outputs a control signal to the pixel signal processing circuit 104 such that the generation timing of the dot clock which is given the dot clock number 1 in the dot clock generator 111 is advanced (for example, the changeover from timing "t2", "t2'" to timing "t1", "t1'", in FIG. 7). Further, when the user operates the input part 26 for shrinking the display image size, the signal processing control part 108 outputs a control signal to the pixel signal processing circuit 104 such that the generation timing of the dot clock which is given the dot clock number 1 in the dot clock generator 111 is delayed (for example, the changeover from timing "t2", "t2'" to timing "t3", "t3'" in FIG. 7).

(Brightness Correction)

Further, the brightness correction of a pixel signal is performed by changing brightness magnification using the brightness adjuster 105. That is, the signal processing control part 108 outputs a control signal to the brightness adjuster 105 such that the brightness magnification corresponding to a display image size designated by an operation of the input part 26 by a user is obtained. The brightness adjuster 105 determines the brightness magnification corresponding to a control signal from the signal processing control part 108. Then, the brightness adjuster 105 adjusts a brightness value of the pixel signal with the brightness magnification determined in this manner.

Accordingly, when a user operates the input part 26 for enlarging an display image size, the adjustment of the brightness value using the brightness adjuster 105 is performed by increasing the brightness magnification. On the other hand, when the user operates the input part 26 for shrinking the display image size, the adjustment of the brightness value using the brightness adjuster 105 is performed by lowering the brightness magnification. For example, when the display image size is changed from "size in the horizontal direction: middle" (scanning range indicated by "B" in FIG. 7) to "size in the horizontal direction: large" (scanning range indicated by "A" in FIG. 7), the brightness magnification is changed T3/T2 times compared to "size in the horizontal direction: middle". Further, when the display image size is changed from "size in the horizontal direction: middle" (scanning range indicated by "B" in FIG. 7) to "size in the horizontal direction: small" (scanning range indicated by "C" in FIG. 7), the brightness magnification is changed T1/T2 times compared to "size in the horizontal direction: middle".

In this manner, the brightness of the pixel signal is changed when the display image size is changed and hence, the image display device can ensure the constant brightness over the whole image even when the display image size is changed.

In changing the display image size in the horizontal direction, the clock table 110 may also be changed corresponding to such a change of the display image size so as to apply the proper arcsin correction to the display image. Due to such a change of the clock table 110, the distortion of the display image can be suppressed so that image quality of the display image can be enhanced.

(2.4.2 Constitution for Changing Display Image Size in the Vertical Direction)

Next, with respect to the change of the display image size, the change of the display image size in the vertical direction is explained.

Figure 8A:
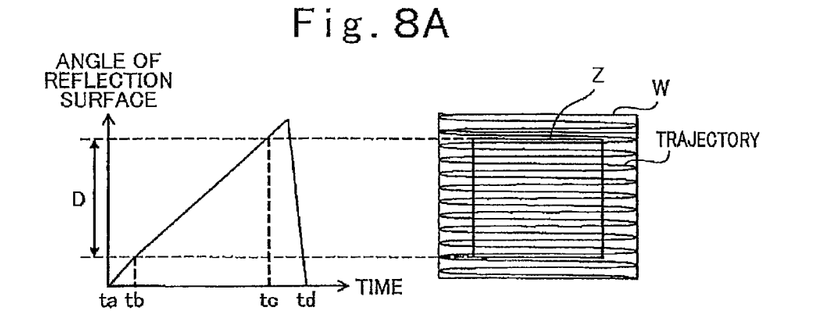
FIG. 8 is a view for explaining a change of a display image size in a vertical direction.
Figure 8B:
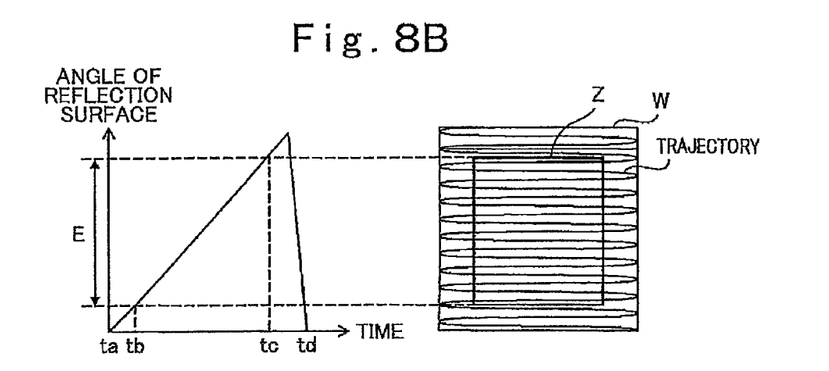
Figure 8C:
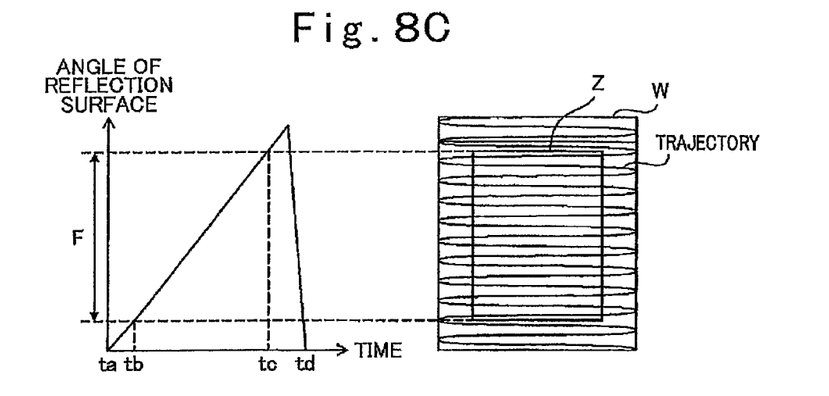

The change of the display image size in the vertical direction is performed by changing the swing range of the reflection surface in the scanning element 81 by the vertical scanning drive circuit 82. The change of the display image size in the vertical direction is explained specifically hereinafter by reference to the drawings. FIG. 8A to FIG. 8C are views for explaining the change of the display image size in the vertical direction in the image display device 1 according to this embodiment. These drawings show a displacement of the reflection surface in the scanning element 81 when the display image size in the vertical direction is "small", "middle" and "large" respectively (the display image size in the horizontal direction being set equal) (a left side of respective drawings) and the display image size in respective states (range indicated by "Z" on a right side of the respective drawings). On the right side of FIG. 8A to FIG. 8C, a trajectory of an optical flux scanned by the horizontal scanning part 70 and the vertical scanning part 80 assuming that the optical flux is constantly radiated from the optical flux generator 20 is virtually indicated. Further, in the same manner as FIG. 2B, the swing range W of the scanning element 71 and the scanning element 81 is shown.

As shown in FIG. 8A to FIG. 8C, the displacement of the reflection surface of the scanning element 81 exhibits a sawtooth-waveform-shaped displacement during a period ta to td, and such a displacement is repeated for every 1 frame (scanning range Z) of an image to be displayed.

Then, during a period tb to tc in FIG. 8A to FIG. 8C, an optical flux is radiated from the optical flux generator 20, and the optical flux is scanned in the vertical direction by the reflection surface of the scanning element 81. However, even within the period tb to tc, when the reflection surface of the scanning element 71 is at a predetermined position (see FIG. 5 and FIG. 7), an optical flux is not radiated from the optical flux generator 20.

As shown in FIG. 8A to FIG. 8C, the change of the display image size in the vertical direction is performed by changing the swing range (swing amplitude) of the reflection surface of the scanning element 81 by the vertical scanning drive circuit 82. That is, the signal processing control part 108 outputs a control signal to the vertical scanning drive circuit 82 such that the swing range of the reflection surface of the scanning element 81 corresponding to the display image size designated by the operation of the input part 26 by a user is obtained. The vertical scanning drive circuit 82, based on a control signal from the signal processing circuit 21, determines the swing range of the reflection surface of the scanning element 81, and swings the reflection surface of the scanning element 81.

Accordingly, when a user operates the input part 26 for enlarging the display image size, the swing range of the reflection surface of the scanning element 81 is increased (for example, from a scanning range indicated by "E" in FIG. 8B to a scanning range indicated by "F" in FIG. 8C). Further, when the user operates the input part 26 for shrinking the display image size, the swing range of the reflection surface of the scanning element 81 is decreased (for example, from the scanning range indicated by "E" in FIG. 8B to a scanning range indicated by "D" in FIG. 8A). In this manner, the display image size in the vertical direction can be changed by changing the swing range (swing amplitude) of the reflection surface of the scanning element 81 and hence, irrespective of the display image size in the vertical direction, the number of scanning lines in the horizontal direction (the number of lines which the optical flux scans in the horizontal direction by the scanning element 71 in the scanning range Z) becomes constant.

(2.4.3 Operation of Display Image Size Change Processing)

Next, display image size change processing in the optical flux generator 20 is specifically explained by reference to a flow chart shown in FIG. 9.

Figure 9:
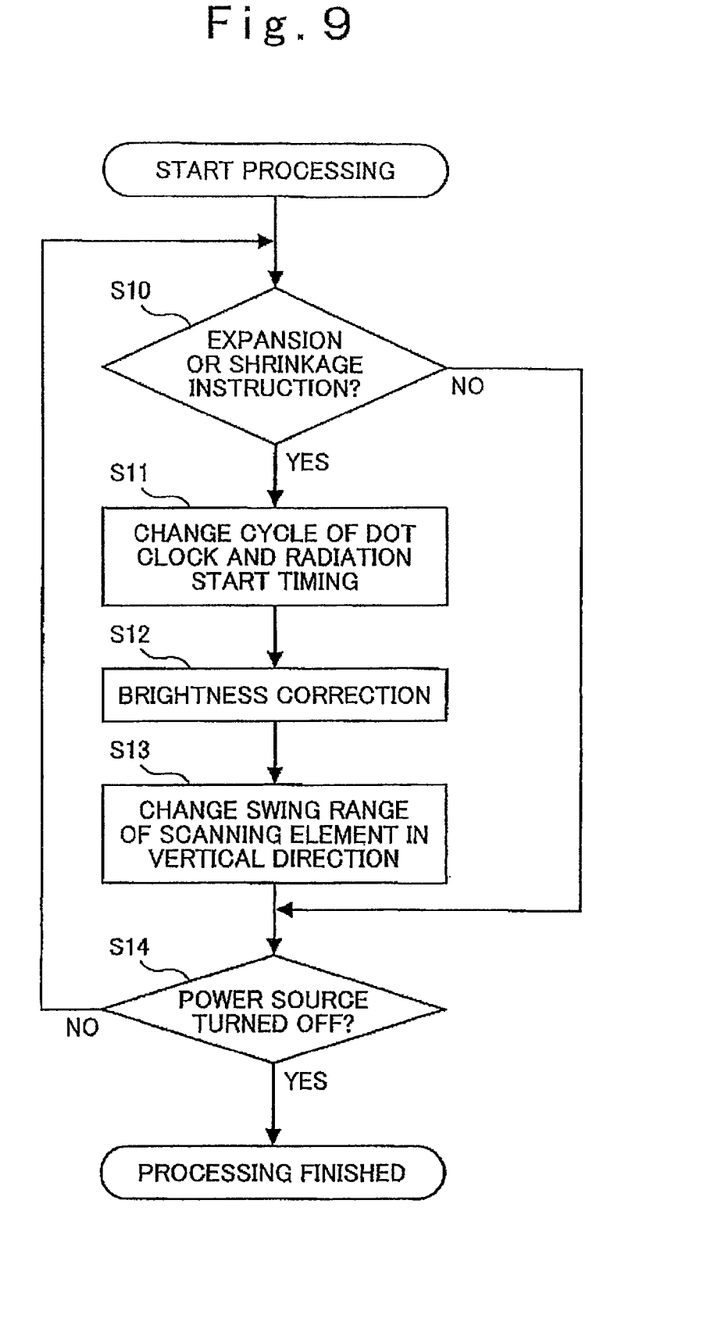
FIG. 9 is a view for explaining process for changing an image.

First of all, the signal processing control part 108 in the signal processing circuit 21, as shown in FIG. 9, determines whether or not a demand for change of the display image size is made by an operation of the input part 26 by a user (step S10).

When it is determined that the demand for change of the display image size is made in this processing (step S10: YES), the signal processing control part 108 changes a period of the dot clock and changes radiation start timing in response to the demand for change of the display image size (step S11), and the processing advances to step S12. These changes are already explained above and hence, the explanation of these changes is omitted here.

In step S12, the signal processing control part 108 performs the brightness correction (change of brightness magnification) by controlling the brightness adjuster 105 such that the brightness of the image is not changed after changing the display image size. This brightness correction is already explained above and hence, the explanation of this brightness correction is omitted here.

When this processing is finished, the signal processing control part 108, for changing the swing range of the scanning element 81 in the vertical scanning part 80, transmits a swing range designation signal 25 corresponding to a demand for change of the display image size to the vertical scanning drive circuit 82. The vertical scanning drive circuit 82 drives the scanning element 81 within a swing range designated by the swing range designation signal 25 (step S13).

When the processing in step S13 is finished or when it is determined that the demand for change of the display image size is not made in step S10 (step S10: NO), the signal processing control part 108 determines whether or not an instruction of turning off a power source of the image display device 1 is detected (step S14). When the signal processing control part 108 determines that the instruction of turning off the power source is detected (step S14: YES), this display image size change processing is finished. On the other hand, when the signal processing control part 108 determines that the instruction of turning off of the power source of the image display device 1 is not detected (step S14: NO), the processing returns to step S10, and the above-mentioned processing ranging from step S10 to step S14 is repeated.

As described above, the image display device 1 of this embodiment changes the display image size by changing the timing at which the optical flux is radiated from the optical flux generator 20 and hence, even when the display image size is changed, an image is not deteriorated and, at the same time, large-sizing of the image display device can be suppressed.

Further, according to the image display device 1 of this embodiment, with the use of the clock table 110 and the lookup table, it is possible to ensure image quality while forming the image display device without using an arcsin θ correction lens.

Here, the change of the display image size may be performed separately between the change in the horizontal direction and the change in the vertical direction, or the change of the display image size may be performed in the horizontal direction as well as in the vertical direction simultaneously. For example, assume a case in which a user can designate "whole image size: large", "whole image size: middle" and "whole image size: small" by operating the input part 26, and the designation is changed from "whole image size: middle" to "whole image size: large". In such a case, both of the image size in the horizontal direction and the image size in the vertical direction are changed to "image size: large", and when the designation is changed from "whole image size: middle" to "whole image size: small", both of the image size in the horizontal direction and the image size in the vertical direction are changed to "image size: small", for example.

Further, in the above-mentioned embodiment, the optical flux radiated from the optical flux generator 20 is scanned at a relatively high speed by the horizontal scanning part 70 and, thereafter, the optical flux is scanned at a relatively low speed by the vertical scanning part 80 thus forming the two-dimensionally scanned light (display-use scanned part). However, a two-dimensionally scanned light (display-use scanned light) may be generated by scanning the optical flux radiated from the optical flux generator 20 by a horizontal scanning part at a relatively low speed and, thereafter, by scanning the optical flux by a vertical scanning part at a relatively high speed. In this case, a non-resonance-type scanning element is provided to the horizontal scanning part as a scanning element, and a resonance-type scanning element is provided to the vertical scanning part as a scanning element.

Further, the above-mentioned embodiment is explained by taking an example in which the display image size is set to three sizes of "large", "middle" and "small" in the respective scanning directions. However, the present invention is not limited to such an example, and the display image sizes may be changed in four or more stages in the respective scanning directions.

Second Embodiment

In the above-mentioned first embodiment, the display image size is changed (expanded or shrunken) such that the scanning range of the optical flux in the horizontal scanning part 70 which performs high speed scanning is changed by changing the timing at which the optical flux is radiated from the optical flux generator 20 without changing the number of dot clocks within the scanning range and, further, the scanning range of the optical flux in the vertical scanning part 80 which performs low-speed scanning is changed by changing the swing range of the reflection surface of the scanning element 81.

In the second embodiment, the display image size is changed (enlarged or shrunken) such that the scanning range of the optical flux in low-speed scanning is performed by changing a scanning period of the optical flux by the reflection surface of the scanning element 81 without changing the swing range of the reflection surface in the scanning element 81, and an oscillation frequency of the scanning element 71 is changed so as to prevent the change of the number of horizontal scanning lines. Here, the image display device of this embodiment has the substantially same constitution as the image display device 1 of the first embodiment, and partially differs from the image display device 1 of the first embodiment with respect to processing or the like. Accordingly, in this embodiment, parts which make this embodiment different from the embodiment 1 are specifically explained. Further, although the resonance-type scanning element is used as the scanning element 71 in the horizontal scanning part 70 in the first embodiment, it is desirable to use a non-resonance-type scanning element when an oscillation frequency of the scanning element is changed. Accordingly, the explanation of the second embodiment is made hereinafter assuming that a non-resonance-type scanning element is used as the scanning element 71 in the horizontal scanning part 70.

Figure 10A:
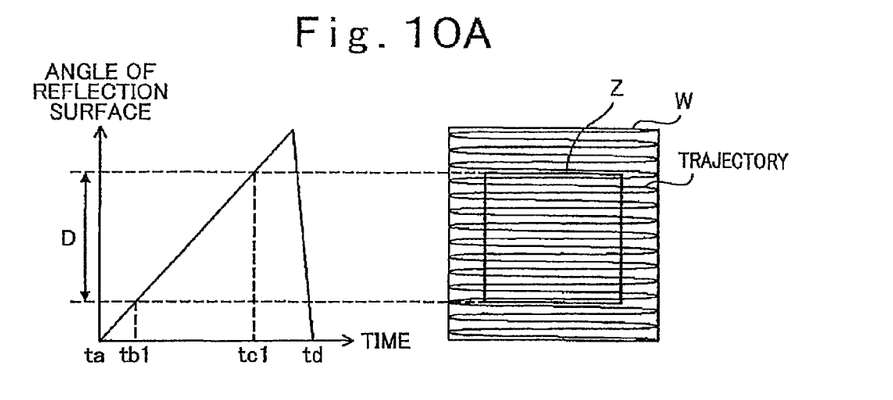
FIG. 10 is a view for explaining a change of a display image size in a vertical direction in an image display device of a second embodiment.
Figure 10B:
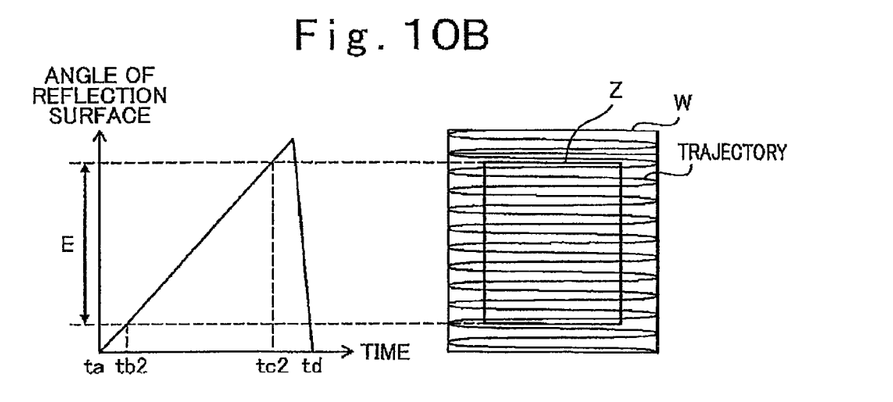
Figure 10C:
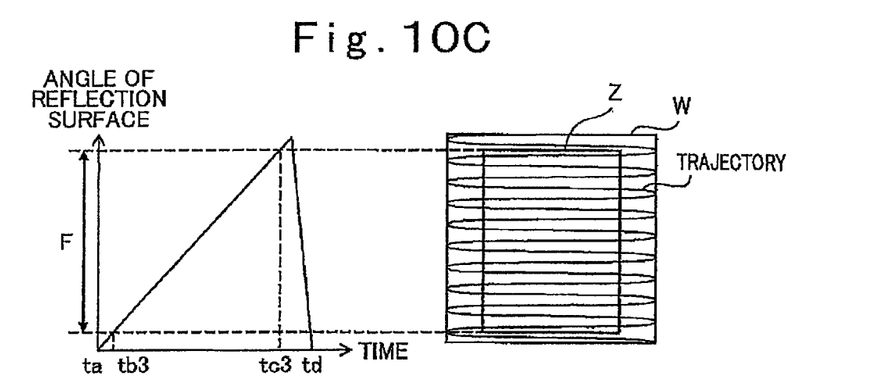

Hereinafter, the image display device of the second embodiment is specifically explained by reference to the drawings. FIG. 10A to FIG. 10C are views for explaining a change of a display image size in a vertical direction in the image display device of this embodiment. These drawings show a displacement of the reflection surface of the scanning element 81 when the display image size in the vertical direction is "small", "middle" and "large" (a left side of respective drawings) and the display image size in respective states (range indicated by "Z" on a right side of the respective drawings). In the same manner as FIG. 2B, a trajectory of an optical flux scanned by the horizontal scanning part 70 and the vertical scanning part 80 assuming that the optical flux is constantly radiated from the optical flux generator 20 is virtually indicated. Further, in the same manner as FIG. 2B, the swing range W of the scanning element 71 and the scanning element 81 is shown.

In the image display device of this embodiment, as shown in FIG. 10A to FIG. 10C, a size of an image in the vertical direction is changed by changing a scanning range (scanning period) of an optical flux on a reflection surface of the scanning element 81 while maintaining a swing range of the reflection surface of the scanning element 81. Further, along with the change of the scanning range of the optical flux in the vertical scanning part 80, a scanning frequency of the optical flux in the horizontal scanning part 70 which performs high-speed scanning is changed. Along with the change of the scanning frequency of the optical flux in the scanning element 71, the correction of timing at which the optical flux is radiated from the optical flux generator 20, a period of dot clocks and the like is performed by the image signal processing part 104.

As shown in FIG. 10A to FIG. 10C, the displacement of the reflection surface of the scanning element 81 exhibits a sawtooth-waveform-shaped displacement during a period ta to td, and such a displacement is repeated for every 1 frame (scanning range Z) of an image to be displayed. All display image sizes exhibits the substantially equal displacement. However, these display image sizes differ in a period in which the optical flux is radiated from the optical flux generator 20, and the display image size in the vertical direction is changed due to such difference in the period. That is, the display image size in the vertical direction is changed by changing the period in which the optical flux is reflected on the reflection surface of the scanning element 81.

For example, when the display image size is "small", an optical flux is radiated from the optical flux generator 20 during a period tb1 to tc1 (see FIG. 10A). When the display image size is "middle", an optical flux is radiated from the optical flux generator 20 during a period tb2 to tc2 (see FIG. 10B). When the display image size is "large", an optical flux is radiated from the optical flux generator 20 during a period tb3 to tc3 (see FIG. 10C). In this manner, the optical flux radiated from the optical flux generator 20 is scanned in the vertical direction by a reflection surface of the scanning element 81. As has been explained by reference to FIG. 7, when the reflection surface of the scanning element 71 is arranged at a predetermined position even within the period tb1 to tc1, the period tb2 to tc2 or the period tb3 to tc3, the optical flux is not radiated from the optical flux generator 20.

Further, the optical flux generator 20 generates, corresponding to a display image size, a control signal for changing an oscillation frequency of the scanning element 71 which is a non-resonance-type scanning element to the horizontal scanning drive circuit 72. The horizontal scanning drive circuit 72 drives the scanning element 71 with an oscillation frequency based on a control signal transmitted from the optical flux generator 20. A scanning frequency in the horizontal direction is changed by changing the oscillation frequency of the scanning element 71 in such a manner thus holding the same number of scanning lines in the horizontal direction within a scanning range Z.

Since the image display device of the second embodiment has such constitution, when a user operates an input part 26 for enlarging a display image size, a scanning period of the optical flux by the reflection surface of the scanning element 81 is prolonged (for example, from a period "tb2 to tc2" in FIG. 10B to a period "tb3 to tc3" in FIG. 10C). On the other hand, the oscillation frequency of the scanning element in the horizontal scanning part 70 becomes slow (for example, the oscillation frequency being decreased 4/5 times when the image size in the vertical direction is increased 5/4 times). By increasing the above-mentioned brightness magnification (for example, by increasing the brightness magnification 5/4 times when the image size in the vertical direction is increased 5/4 times), the image display device can ensure the constant brightness over the whole image even when the display image size is enlarged.

Further, when the user operates the input part 26 for shrinking the display image size, the scanning period of the optical flux by the reflection surface of the scanning element 81 is shortened (for example, from the period "tb2 to tc2" in FIG.

10B to the period "tb1 to tc1" in FIG. 10A). On the other hand, the oscillation frequency of the scanning element in the horizontal scanning part 70 becomes fast (for example, the oscillation frequency being increased 5/4 times when the image size in the vertical direction is decreased 4/5 times). By decreasing the above-mentioned brightness magnification (for example, by decreasing the brightness magnification 4/5 times when the image size in the vertical direction is decreased 4/5 times), the image display device can ensure the constant brightness over the whole image even when the display image size is shrunken.

In this manner, the scanning range of the optical flux in the vertical scanning direction is changed by changing the timing at which the optical flux is radiated from the optical flux generator 20 and, further, the size of the image to be displayed is changed by changing the oscillation frequency of the scanning element in the horizontal scanning direction using the optical flux generator 20 and hence, no particular image processing is necessary. Accordingly, it is possible to change the display image size in the vertical direction as well as in the horizontal direction without deteriorating the image and, at the same time, it is possible to suppress large-sizing of the image display device.

Further, in the second embodiment, in changing the scanning range of the optical flux in low-speed scanning, the oscillation frequency of the scanning element 71 is changed to prevent the number of horizontal scanning lines from being changed. However, the scanning range of the optical flux in low-speed scanning may be changed by only changing the scanning period of the optical flux by the scanning element 81 without changing the oscillation frequency of the scanning element 71. In this case, it is necessary to increase or decrease the number of (effective) horizontal scanning lines which display an image along with the change of the scanning range of the optical flux in low-speed scanning. In the signal processing circuit 21, to realize the expression of the image with the above-mentioned number of horizontal scanning lines, the number of horizontal scanning lines is increased or decreased by performing image processing which changes an expansion or shrinkage (for example, thinning of the image) ratio of the image.

Although several embodiments of the present invention have been explained in detail by reference to drawings heretofore, these embodiments are provided as merely examples, and the present invention can be carried out in other modes to which various modifications and improvements are applied based on a knowledge of those who are skilled in the art.

For example, in the above-mentioned embodiment, the constitution which changes the period of the master clocks by controlling the master clock generator 107 has been explained. However, the image display device may include a plurality of master clock generators which differ in a period of master clocks, and a selection part (for example, a switch or the like) which selects one master clock generator from the plurality of master clock generators, and the master clock generator may output master clocks to a dot clock generator corresponding to a display image size by operating the selection part by the input part 26.

Further, the master clock generator 107 may have the exchangeable constitution. That is, the master clock generator 107 may be mounted on the optical flux generator 20 using a detachable connector which is provided between the master clock generator 107 and the optical flux generator 20. Due to such constitution, the master clock generator 107 which conforms to the display image size can be mounted and hence, the number of the above-mentioned clock tables can be decreased as much as possible. As a result, an occupation ratio of memory regions relating to the clock tables can be lowered.

What is claimed is:

1. An image display device comprising:
   an optical flux generator which is configured to generate and radiate an optical flux in response to an image signal read out for respective dot clocks; and
   an optical scanning part which is configured to display an image by scanning the optical flux two-dimensionally, wherein
   a size of the image to be displayed is changed by changing timing at which the optical flux is radiated from the optical flux generator, and
   the optical flux generator changes the timing at which the optical flux is radiated from the optical flux generator by changing a period of the dot clocks.

2. An image display device according to claim 1, wherein the optical flux generator includes a dot clock generator which generates the dot clocks by dividing a frequency of a master clock, and a period of the dot clocks is changed by changing a period of the master clocks.

3. An image display device according to claim 1, wherein the optical flux generator includes a dot clock generator which generates the dot clocks by dividing a frequency of the master clock at a predetermined frequency dividing ratio, and the period of the dot clocks is changed by changing the frequency dividing ratio.

4. An image display device according to claim 1, wherein the optical scanning part includes a high-speed scanning part which scans the optical flux at a relatively high speed with respect to a first scanning direction and a low-speed scanning part which scans the optical flux at a relatively low speed with respect to a second scanning direction, and
   the size of the image relating to the first scanning direction is changed by changing timing at which the optical flux is radiated from the optical flux generator relating to the first scanning direction.

5. An image display device according to claim 4, wherein the high-speed scanning part includes a resonance-type scanning element which scans the optical flux.

6. An image display device according to claim 4, wherein the low-speed scanning part includes a scanning element which scans the optical flux by swinging a reflection surface of the scanning element, and the size of the image relating to the second scanning direction is changed by changing a swing range of the reflection surface.

7. An image display device according to claim 1, wherein the optical scanning part includes a high-speed scanning part which scans the optical flux at a relatively high speed with respect to a first scanning direction and a low-speed scanning part which scans the optical flux at a relatively low speed with respect to a second scanning direction, and
   the size of the image relating to the second scanning direction is changed by changing a scanning range of the optical flux in the second scanning direction due to a change of the timing at which the optical flux is radiated from the optical flux generator relating to the second scanning direction.

8. An image display device according to claim 1, wherein the image display device is a retinal scanning display which displays the image by projecting the optical flux scanned by the optical scanning part on a retina of a user.

* * * * *